E. SCHNEIDER.
METAL TIRE FOR VEHICLE WHEELS.
APPLICATION FILED SEPT. 25, 1912.
1,151,905.
Patented Aug. 31, 1915.
2 SHEETS—SHEET 1.
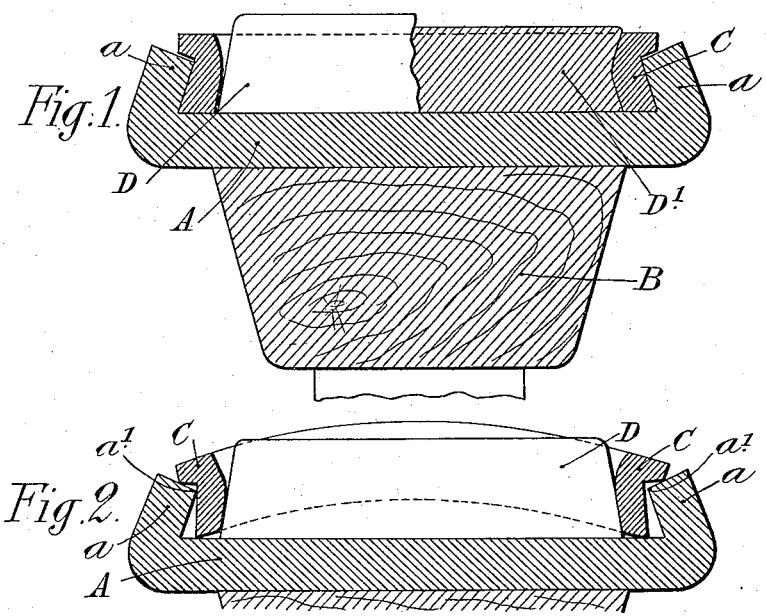

E. SCHNEIDER.
METAL TIRE FOR VEHICLE WHEELS.
APPLICATION FILED SEPT. 25, 1912.
1,151,905.
Patented Aug. 31, 1915.
2 SHEETS—SHEET 2.
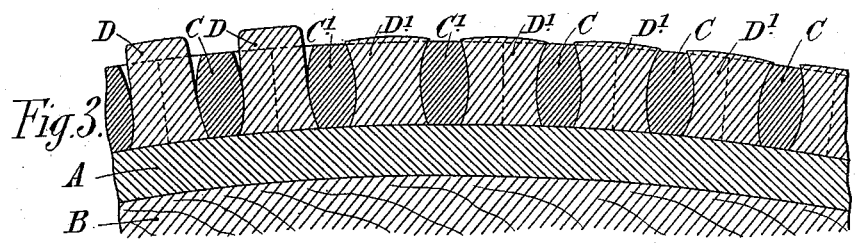
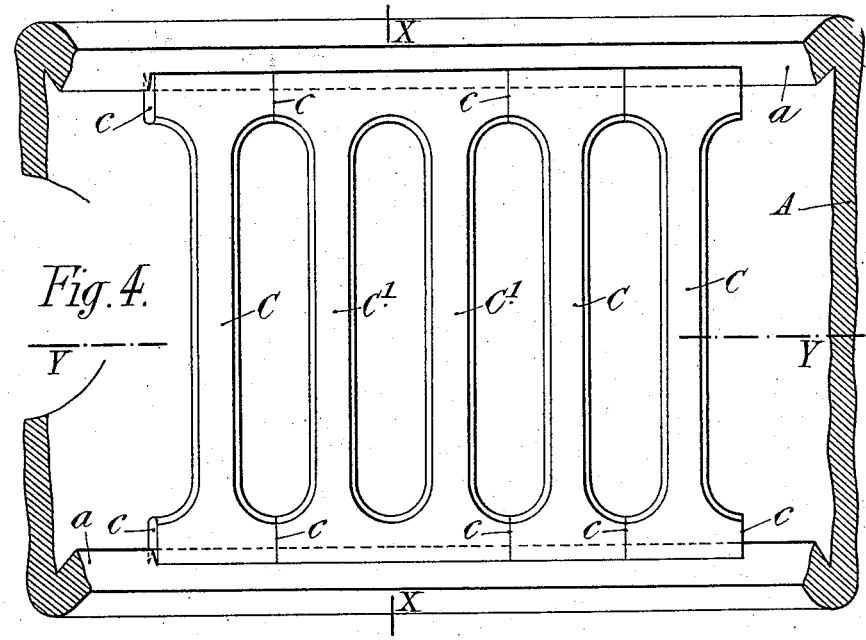

UNITED STATES PATENT OFFICE.

EUGÈNE SCHNEIDER, OF LE CREUZOT, FRANCE.

METAL TIRE FOR VEHICLE-WHEELS.

1,151,905.      Specification of Letters Patent.      Patented Aug. 31, 1915.

Application filed September 25, 1912. Serial No. 722,366.

*To all whom it may concern:*

Be it known that I, EUGÈNE SCHNEIDER, of Le Creuzot, Saône-et-Loire, France, have invented new and useful Improvements in Metal Tires for Vehicle-Wheels, which is fully set forth in the following specification.

Hitherto tires have been constructed comprising a tread band of strong metal such as steel or the like which is formed with a series of holes or grooves filled with a metal of less hardness such as aluminium for example, in such a manner that the whole presented a heterogeneous running or tread surface which was favorable to adhesion. In these known devices the constituent elements of the tire united by casting or riveting are with difficulty replaced as regards their worn portions; furthermore, assemblage by riveting frequently gives rise to shearing of the rivets.

Similar to the tires referred to above the improved tire now contemplated comprises a band of hard metal having insertions of metallic elements of less hardness. The band of hard metal is characterized by the fact that it is constituted by a grating formed of a series of transverse elements arranged in juxtaposition, the intervals between the grating elements and the recesses formed in these elements forming a corresponding number of housings for bars or blocks which are simply passed through in the operation of manufacture, the assemblage of the grating bars and the blocks of soft metal being insured by their respective profiles and by the fitting of the grating elements in the beadings of the rim. To this end the grating elements are curved with the object of placing them in such position that the inner base is able to engage between the edges of the beadings by a hammering which destroys the curvature and simultaneously produces the complete engagement of the grating in the beadings of the rim and the imprisonment of the bars or blocks in the housings in the grating.

A practical form of carrying the invention into practice is represented by way of example in the accompanying drawing, in which:—

Figure 1 is a cross section on the line X X in Fig. 4 showing the tire after hammering the grating of hard metal. Fig. 2 is a similar section showing the grating element bent for placing it in position. Fig. 3 is a partial longitudinal section on the line Y Y in Fig. 4 which is a partial top plan.

The tire is supposed to be fitted to a rim A provided with beadings $a$ and fixed to a wheel body B of any convenient construction.

The tire is constituted by a grating of hard metal formed of a series of I-shaped elements or bars C united in pairs or groups of three or more the bases of the I of each bar forming a joint with the corresponding bases of the following bar in such a manner that between the webs of the successive I's housings or recesses are formed for the reception of the soft metal blocks D (of aluminium for example) which complete the tire. Upon the plane of Fig. 4 three simple I shaped bars C have been shown by way of example and a bar C' formed by two assembled I's. The lateral faces $c$ of the bases of these successive I's adjoin in the completely fitted tire.

The bases of the I's present such a form that after being arranged in position they exactly fit into the beadings $a$ of the rim. For the purpose of arranging them in place the bars are bent as shown in Fig. 2 thereby enabling them to be engaged between the internally projecting edges $a'$ of the beadings $a$. The filling bars or blocks D are formed in such a manner that they can be engaged in the housings between two bent bars C arranged in juxtaposition.

The elements being thus arranged (Fig. 2) the curvature of the bars C is removed by hammering until the bars exactly fit into the rim beadings (Fig. 1) simultaneously imprisoning by reason of the convexity of the inner face of said bars the blocks D as indicated by the left hand portion of Fig. 1 and also by the two end blocks at the left hand side of Fig. 3. The blocks D are then flattened by hammering as shown at D' Figs. 1 and 3.

It will be readily understood that the tire described dispenses with any fixing members liable to be sheared off and to become detached in use. It is also easy to repair the tire in replacing the iron elements.

It is obvious that instead of being continuous the housings between the successive I-shaped bars or formed between the elements of the juxtaposed bars might be divided for the reception of a plurality of blocks of soft metal; the assembled I- shaped bars would then form H-shaped bars.

What I claim and desire to secure by Letters Patent of the United States is:—

1. A metal tire for vehicle wheels consisting of a rim having inturned beadings, flat tread elements having their ends adapted to be held under said beadings and having reëntering sides with convex edges to form holding recesses, and other tread elements held in said recesses.

2. A metal tire for vehicle wheels consisting of a rim having inturned beadings, flat tread elements of hard metal having their ends adapted to be held under said beadings and having reëntering sides with convex edges to form holding recesses, and other tread elements of soft metal held in said recesses.

In testimony whereof I have signed this specification in the presence of two subscribing witnesses.

EUGÈNE SCHNEIDER.

Witnesses:
HANSON C. COXE,
R. DE SERCLINGER.

Copies of this patent may be obtained for five cents each, by addressing the "Commissioner of Patents, Washington, D. C."